V. G. APPLE.
SYSTEM OF POWER TRANSMISSION.
APPLICATION FILED JAN. 19, 1914.
1,264,748.
Patented Apr. 30, 1918.
2 SHEETS—SHEET 1.
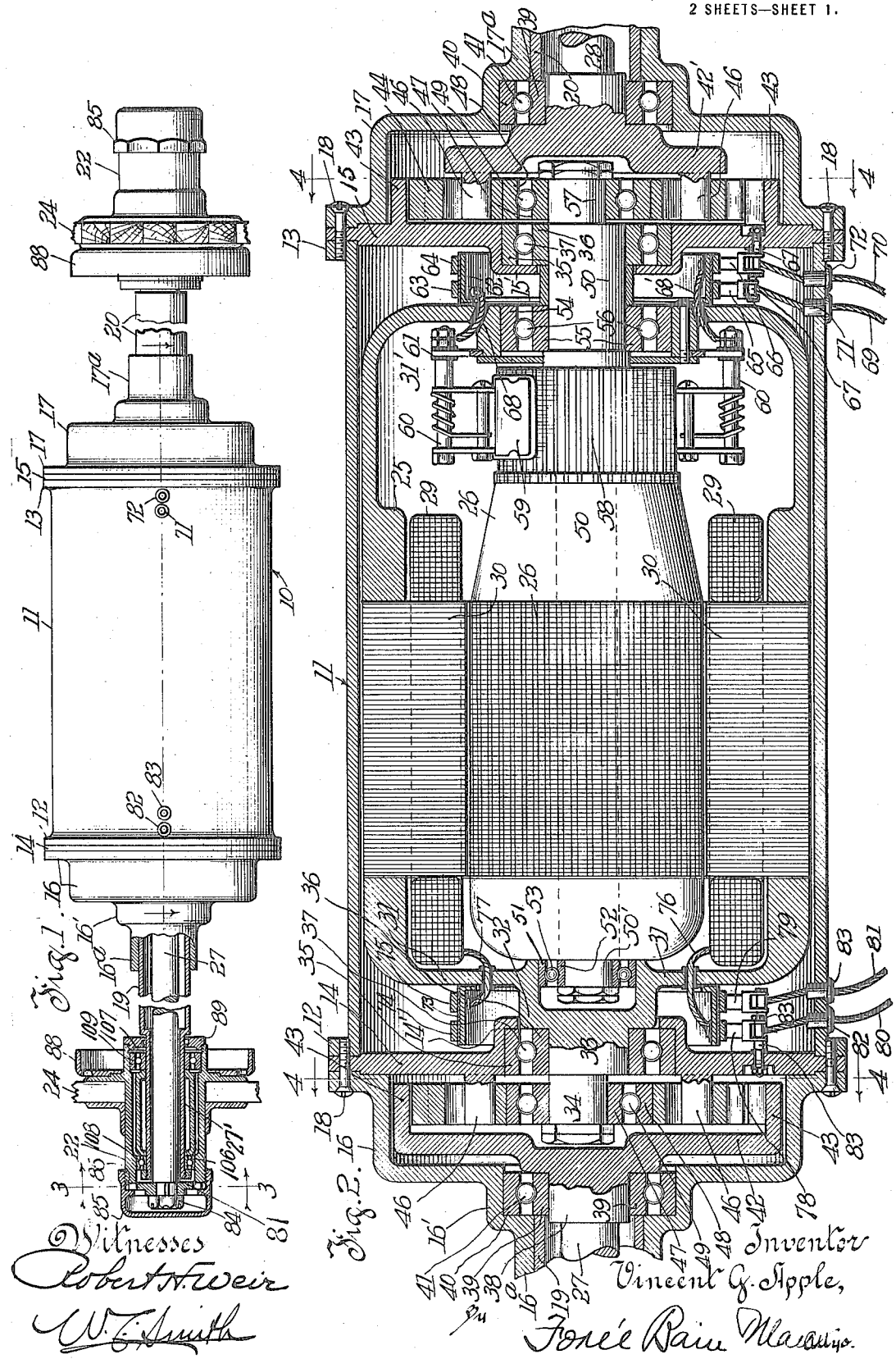

V. G. APPLE.
SYSTEM OF POWER TRANSMISSION.
APPLICATION FILED JAN. 19, 1914.
1,264,748.
Patented Apr. 30, 1918.
2 SHEETS—SHEET 2.
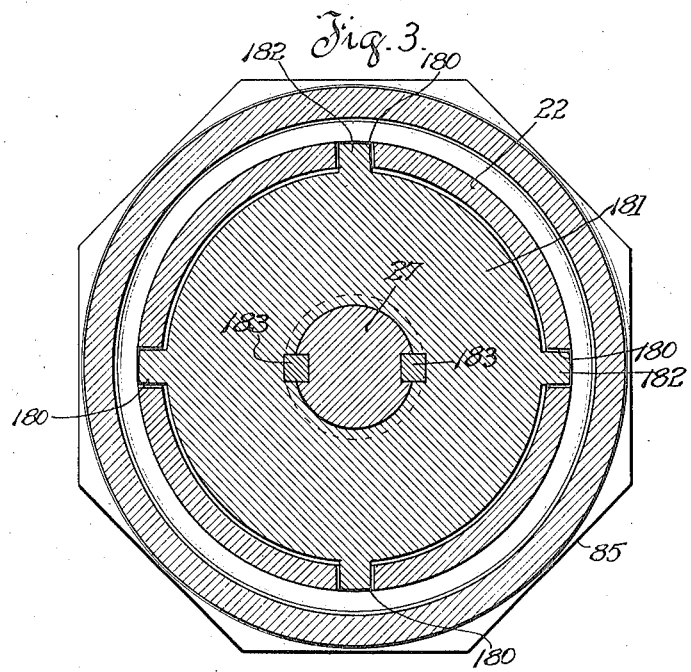
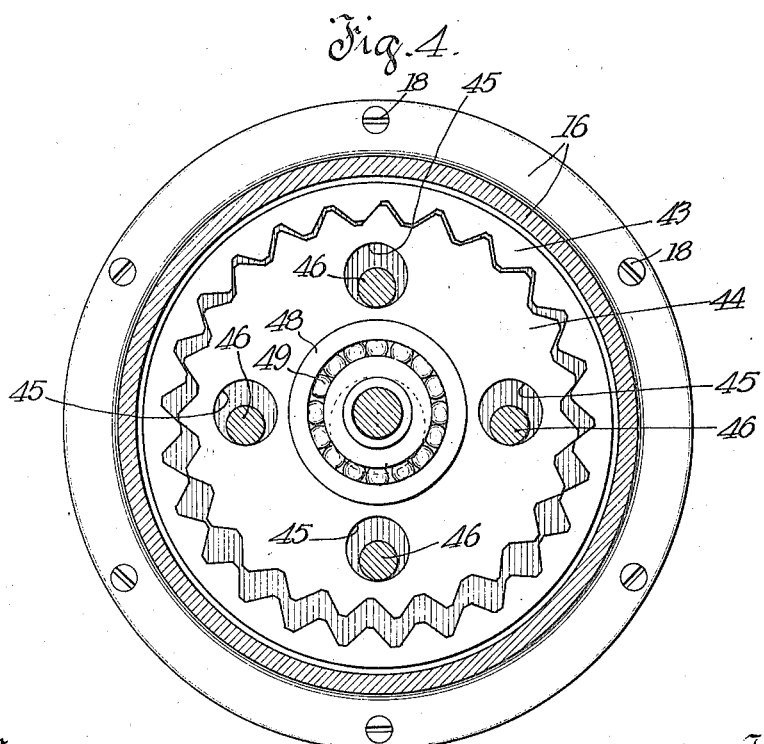
Witnesses
Robert S. F. Weir
W. F. Smith
Inventor
Vincent G. Apple,
by Toner Bain & May
Attys

UNITED STATES PATENT OFFICE.

VINCENT G. APPLE, OF DAYTON, OHIO.

SYSTEM OF POWER TRANSMISSION.

1,264,748.      Specification of Letters Patent.      Patented Apr. 30, 1918.

Application filed January 19, 1914. Serial No. 812,981.

*To all whom it may concern:*

Be it known that I, VINCENT G. APPLE, a citizen of the United States, residing at Dayton, in the county of Montgomery and State of Ohio, have invented certain new and useful Improvements in Systems of Power Transmission, of which the following is a specification.

One of the objects of my invention is to provide a new, useful and valuable system of power transmission, consisting of a series of associated coöperating devices and parts, especially well adapted for use in automobile constructions.

Another object of my invention is to condense, unify, and cheapen the cost of production of the power-producing and transmitting mechanism of such vehicles, as by the direct arrangements of the parts, in the manner hereinafter disclosed, to thereby increase the efficiency of the system, as a whole.

Other and further objects of my invention will become readily apparent to persons skilled in the art from a consideration of the following description when taken in conjunction with the drawings, wherein;

Figure 1 is a plan view of the device, a part of which is shown in section;

Fig. 2 is an enlarged, longitudinal, central section of the major part of the device;

Fig. 3 is an enlarged transverse section, taken on line 3—3 of Fig. 1; and

Fig. 4 is a transverse section taken on either of the lines 4—4 of Fig. 2.

In all the views the same reference characters are employed to indicate similar parts.

There is inclosed in the casing 10 an electric motor, or other source of power; speed changing gearing; equalizing mechanism and a floating shaft extending from each end thereof for connection with the traction wheels of a vehicle. Therefore, this casing incloses all of the mechanism and devices necessary for efficiently imparting power to the traction wheels of the vehicle. In other words, the casing incloses the complete power plant with all of the necessary mechanism. This power plant being self-contained may conveniently be supported entirely upon the traction wheels of a vehicle, in a manner to be hereinafter described.

Specifically, 11 is a cylindrical casing provided with end flanges 12 and 13. Bearing plates, or disks 14 and 15, are secured to the respective ends of the casing. Housing caps or heads 16 and 17 are also secured to the ends of the cylindrical portion 11, as by screws 18, that take through the said housing caps, plates, and the flanges 12 and 13 of the cylindrical portion 11.

Secured in the ends of the heads 16 and 17, respectively, are tubes 19 and 20 which constitute the ridged or fixed axles of the structure. The ends of these tubes bear the hubs 22 and 22, respectively, to which the wheels 24 and 24, respectively, are attached. The foregoing mentioned parts constitute the casing in which my power plant is inclosed.

In the illustrated embodiment of my invention an electric motor is employed for delivering the power to the respective traction wheels. The field magnet structure 25 is made to rotate in one direction, while the armature structure 26 is caused to rotate in the opposite direction as usual when such elements are both rotatably supported. The axle shaft 27 is driven through proper speed changing gearing by the rotation of the field magnet element, while the axle shaft 28 is driven through suitable speed changing gearing by means of the armature element. The construction of the speed changing mechanism is such that the active shafts 27 and 28 are caused to rotate in the same direction.

As the torque developed by either of the rotating elements, (either the field magnet or the armature), is dependent upon the resistance to rotation encountered by the other one of said elements, there is thereby interposed an equalizing effect by the rotating elements, so that if one of the traction wheels, to which either of the rotating elements be connected, has imposed thereon a greater friction than the other traction wheel, as in going around a curve, the traction wheel encountering the least resistance will travel at a higher velocity while the one having the greater resistance will remain substantially stationary or travel at a very much lower velocity, thereby a desirable equalizing effect is produced.

The dynamo-electric-machine or motor may be of the bi-polar or multi-polar type, as desired, the former being shown in the drawings, wherein 25 is the magnetic frame structure and 29 are the windings or the field coils which surround the pole pieces 30. I prefer to use a bi-polar machine because being of high speed and very light, everything else being equal, it will produce more power per pound of material than machines of the multi-polar type, and which rotate at relatively slower speed.

The speed-changing mechanism herein has such large capacity as to be equally available in reducing the speed of a high speed motor as if the motor rotated at a relatively lower speed.

The field magnet frame 25 terminates in an end plate 31, at its driving end having a hub 32 and a concentric portion 33, the latter constituting a portion of the shaft upon which the field magnet structure rotates. A projection 34 is eccentric to the axis of the shaft of the field magnet structure and by this eccentric portion, coöperating with the other portion of the gearing, the speed of the field magnet structure is reduced in its transition from the dynamo element to the active shaft 27.

In the hub 14′ of the bearing plate 14 is located a bearing ring 35 which, with the bearing rings 36 and the balls 37, constitute the bearing support for the field magnet structure in the frame 10. By this means the power end of the rotating field magnet is supported.

The active shaft 27 is provided with a concentric portion 38 which carries a bearing ring 39 coöperating with the bearing ring 40 and the balls 41. The bearing ring 40 is secured in the hub 16′ of the head 16. This affords a bearing for the inner end of the shaft 27. The shaft 27 terminates in the casing 10 in an enlarged disk 42 having an overhanging internally-toothed rim 43.

Loosely supported in the inter-dental space of the gear 43 is a spur gear wheel 44, which is provided with a less number of teeth than is contained in the associate geared element 43. In the illustrated embodiment the internal gear wheel 43 is provided with 25 teeth while the pinion 44 is provided with 23 teeth, therefore, the reduction of speed between the element 25 and the shaft 27 will be in the ratio as 25 is to 2.

The pinion 44 is perforated, as at 45, and is thus loosely supported on studs 46 that are secured to the field end plate 14. These studs, therefore, are fixed and are not rotatable, but permit a certain limited free movement of the floating pinion 44.

Mounted on the eccentric 34 is a bearing ring 47 having bearing relation with the ring 48 that is fixed in the pinion 44 and with the balls 49 that are contained between the rings 47 and 48. The studs 46 permit considerable lateral movement, in all directions, of the pinion 44 when the eccentric 34 is rotated, but prohibit the pinion 44 from rotating with the eccentric. Now it is evident that when the eccentric 34 is rotated, the eccentrically operated floating pinion will be laterally moved in every direction and produce a wedging effect between the teeth of said pinion and those of the internal gear 43, and the ratio of rotation of the gear 43 with reference to the rotation of the eccentric 34 will be as 2 is to 25, or in other words, it will take twelve and one half revolutions of the eccentric 34 and, therefore, of the field element, to produce one revolution of the gear 43 and thereby of the driven shaft 27.

The armature shaft 50 at its rear end is provided with a bearing consisting of the rings 51, 52 and the balls 53. This bearing is interposed between the parts 50′ of the armature shaft and the rotating portion 31 of the field magnet frame.

The commutator end is provided with a bearing comprising the rings 35 and 36 and the balls 37 in the fixed bearing disk 15 of the frame and the end 31′, of the field magnet frame, is provided with a bearing for the armature shaft comprising the rings 54 and 55 and the balls 56.

The eccentric portion 57 of the shaft 50 operates the speed-changing means on the commutator end of the structure. This speed-changing gearing means is substantially the same as that which is contained at the rear end of the armature, and which has heretofore been described, with the exception that in the armature end the studs 46 are free to rotate and the internal gear member is fixed to the casing, by this means, the rotating elements that are connected to the shafts 27 and 28 are caused to move in the same directions as will be clearly understood.

The shaft 28 is enlarged, as at 42′, which enlargement carries the rotating studs 46. This portion of the apparatus is connected directly to, or is a part of, the active shaft 28.

A commutator 58 is secured to the shaft 50 and is connected in the usual manner to the armature 26. Conducting brushes 59—59, of which there are two, only one being shown in the drawings, are secured in the usual manner to the studs 60. These studs bear the commutator brushes and are insulatedly supported on the yoke 61, which latter is carried by the field magnet structure 25.

Secured to the field magnet structure 25 is a flanged ring 62 which carries insulated conducting rings 63 and 64. Studs 67 that are insulated from and secured to the bearing plate 15, carry conducting brushes 65 and 66. The rings 63 and 64 are connected to the insulated studs 60—60, as by wires 68 and 68′, respectively. The brushes 65 and 66 and the studs 67 that carry them are stationary at all times, and are fixed to the casing 10.

Wires 69 and 70 may pass through insulated bushings 71 and 72 placed in the cylindrical portion 11 of the casing 10, and connect to the brushes 65 and 66, respectively. By this means the windings of the rotating armature is electrically connected to the wires 69 and 70.

The field magnet frame or head 31 carries a flanged ring 73 upon which is insulatedly fixed conducting rings 74 and 75. These rings are connected to the field magnet windings 29 by wires 76 and 77, respectively. Brushes 78 and 79 bearing upon the respective rings and wires 80 and 81, pass through insulating bushings 82, 82 and are connected to the brushes 78 and 79, respectively. The brushes are supported upon the studs 83—83 that are fixed to the head 14 or other stationary portion of the frame, so that communication may be had through the wires 80 and 81 with the field windings of the rotating field. The covering heads 16 and 17 of the frame are provided with hollow hubs 16ᵃ and 17ᵃ, respectively, into which the fixed tubular axles consisting of the tubes 19 and 20 are secured. The interiors of the tube axles 19 and 20 are somewhat larger than the respective shafts 27 and 28, so that the shafts may turn freely therein. They are reduced in diameter, as at 27', to receive the hubs 22—22, the reduced parts carrying ball or roller bearing members 106 and 107, which coöperate with bearing members 108 and 109 that are carried by the hubs, so that the hubs rotate freely upon the fixed axles. The hubs and the coöperating parts are duplicates and I am, therefore, describing the hub 22, that is illustrated in section in Fig. 1 with the understanding that the hub 22 shown on the other end of the structure is practically the same. The end portions of the hubs 22 and 22 are provided with depressions or recesses 180—180, of which there may be any desirable number, the drawings showing four, and a plate 181 having projections 182 that fit in the depressions 180 is secured to the shafts 27 and 28, as by means of keys 183. Nuts 84—84 are secured on the threaded ends of the shafts 27 and 28 to retain the plates 181—181 in position, and hub caps 85—85 are screw-threaded on the ends of the hubs, as at 86—86, to protect the interiors thereof from dust and other extraneous influences. It will be manifest, from this arrangement, that the power of shafts 27, 28, is conveyed positively to the hubs. The hubs may bear friction brake wheels 88—88, as usual, in such structures. An inner cap 89—89 operates as a dust guard to close the inner ends of the hubs.

While the armature and field magnets of the dynamo electric machine will rotate in opposite directions with reference to each other, the speed-changing mechanism is of such character that the shafts 27 and 28 will be rotated at like speed in the same direction, so that the traction wheels, 24 and 24 of a moving vehicle will be driven so that each wheel will participate in propelling the vehicle in a given direction.

It is understood, of course, that the casing 10 and the fixed axles composed of the tubes 19 and 20 are stationary and that the vehicle body may rest upon these axles, as by spring supports in cases where the axles are stationary and an internal, rotatable, or floating axle, is used to operate the wheels of the vehicle.

While I have herein described a single embodiment of my invention, it is evident that changes may be made in the shape and location of parts within the scope of the appended claims.

What I claim is:

1. A rear axle for a motor vehicle comprising a pair of alining spaced apart tubular vehicle supporting members, cup shaped members formed on the inner end of each tubular member, a separable cylindrical housing of uniform diameter positioned between the tubular members and connected at its ends to the peripheries of the cup shaped members; a dynamo electric machine positioned within the housing and comprising independently rotatable field and armature, vehicle wheel driving shafts carried within the tubular members and speed reducing gearing connecting the rotatable parts of said dynamo with the shafts and positioned entirely within the cup shaped members.

2. A rear axle for a motor vehicle comprising a pair of alining spaced apart tubular vehicle supporting members, cup shaped members formed on the inner end of each tubular member, end walls covering the inner ends of the cup shaped members, a cylindrical housing of uniform diameter positioned between the tubular members and connected at its ends to the peripheries of the cup shaped members, a dynamo electric machine positioned within the housing and comprising independently rotatable field and armature, bearings carried by the heads for supporting the rotatable parts of said dynamo, vehicle wheel driving shafts carried within the tubular members and speed reducing gearing connecting the rotatable parts of said dynamo with the shafts and positioned entirely within the cup shaped members.

3. In a vehicle transmission the combination of a pair of coaxial spaced apart wheel driving shafts, tubular shaft casings carried by the vehicle and having their inner ends spaced apart, a motor housing joining the adjacent ends of said tubular casings, a motor comprising oppositely rotatable field member and armature member positioned in the housing, speed reducing gearing connecting one member with one of the shafts, speed reducing gearing connecting the other member with the other shaft, said last mentioned gearing comprising an eccentric driven by its respective member, a pinion rotatably mounted on the eccentric, a stationary internal gear having a greater number of teeth than the pinion and meshing therewith, and a pin and slot connection between the pinion and its wheel driving shaft.

In testimony whereof I hereunto set my hand in the presence of two witnesses.

VINCENT G. APPLE.

In the presence of—
  FOWLER S. SMITH,
  N. E. SNYDER.